United States Patent
Paasonen

(10) Patent No.: US 7,452,579 B2
(45) Date of Patent: Nov. 18, 2008

(54) METHOD FOR MANUFACTURING A COATING FOR A ROLL

(75) Inventor: Jan Paasonen, Kerava (FI)

(73) Assignee: Metso Paper, Inc., Helsinki (FI)

( * ) Notice: Subject to any disclaimer, the term of this patent is extended or adjusted under 35 U.S.C. 154(b) by 449 days.

(21) Appl. No.: 10/553,786

(22) PCT Filed: May 24, 2004

(86) PCT No.: PCT/FI2004/050075

§ 371 (c)(1),
(2), (4) Date: Oct. 25, 2005

(87) PCT Pub. No.: WO2004/103582

PCT Pub. Date: Dec. 2, 2004

(65) Prior Publication Data

US 2006/0172072 A1 Aug. 3, 2006

(30) Foreign Application Priority Data

May 23, 2003 (FI) ................................. 20030783

(51) Int. Cl.
*B32B 27/00* (2006.01)

(52) U.S. Cl. .................... 428/36.9; 492/50; 492/51; 492/52; 492/53; 492/49; 29/895; 29/895.212; 427/372.2

(58) Field of Classification Search ................ 428/357, 428/375; 492/40, 52, 49, 51, 53, 60; 264/DIG. 57, 264/DIG. 59; 156/275.5, 276, 272.2, 295, 156/298, 311, 312; 29/895, 895.3, 895.32, 29/895.212; 427/372.2
See application file for complete search history.

(56) References Cited

U.S. PATENT DOCUMENTS

| | | | |
|---|---|---|---|
| 3,184,828 A | 5/1965 | Dames, Jr. | |
| 3,283,714 A | 11/1966 | Carpenter et al. | |
| 4,003,778 A * | 1/1977 | Phillips | 156/289 |
| 4,339,858 A * | 7/1982 | Peterson | 492/48 |
| 4,368,568 A | 1/1983 | Watanabe | |
| 5,091,027 A | 2/1992 | Watanabe | |
| 5,334,124 A * | 8/1994 | Ohno | 492/50 |
| 5,415,612 A * | 5/1995 | Carlson et al. | 492/56 |
| 5,544,584 A * | 8/1996 | Thompson et al. | 101/401.1 |
| 5,589,246 A * | 12/1996 | Calhoun et al. | 428/120 |
| 5,599,266 A * | 2/1997 | Landl et al. | 492/56 |
| 5,601,920 A | 2/1997 | Paasonen et al. | |
| 5,711,072 A * | 1/1998 | Nakamura | 29/895.32 |
| 5,753,165 A | 5/1998 | Watanabe et al. | |
| 5,958,533 A | 9/1999 | Paasonen et al. | |
| 6,136,447 A * | 10/2000 | Nakamura et al. | 399/338 |
| 6,328,681 B1 | 12/2001 | Stephens | |
| 6,409,645 B1 | 6/2002 | Paasonen et al. | |
| 6,514,369 B1 * | 2/2003 | Shieh | 156/154 |
| 6,739,051 B2 * | 5/2004 | Park | 29/895.213 |
| 7,135,137 B2 * | 11/2006 | Nakayama et al. | 264/262 |

FOREIGN PATENT DOCUMENTS

| | | |
|---|---|---|
| EP | 0 083 301 A1 | 7/1983 |
| WO | WO 98/11166 | 3/1998 |

* cited by examiner

*Primary Examiner*—Carol Chaney
*Assistant Examiner*—Michele Jacobson
(74) *Attorney, Agent, or Firm*—Oliff & Berridge, PLC

(57) ABSTRACT

The invention relates to a method for manufacturing a roll coating onto a roll frame (1), which coating comprises a base layer (2) on the roll frame (1) and a surface layer (3) on the base layer (2). The base layer (2) is brought to its final form after the surface layer (3) has been formed and cured or solidified. The surface layer (3) is formed on the base layer (2) and cured or solidified after the base layer (2) has been formed on the roll frame (1).

7 Claims, 1 Drawing Sheet

METHOD FOR MANUFACTURING A COATING FOR A ROLL

Figure 1:
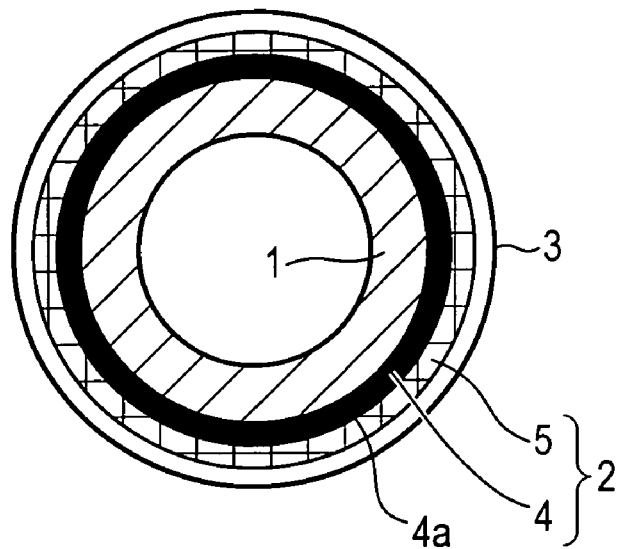

This invention relates to a method for manufacturing a roll coating onto a roll frame, which coating comprises a base layer on the roll frame and a surface layer on the base layer, and in which method the base layer is brought to its final form after the surface layer has been formed and cured or solidified.

In many known roll manufacturing methods there is the problem that residual stresses remain in the roll coating material in connection with the manufacture. The residual stresses cause the usage time of the rolls to shorten, because the residual stresses may cause the stress endurance of the coating material to be exceeded, in which case initial cracks form in the coating material, or permanent deformations.

The problems connected to residual stresses have been aimed to be solved by forming the coating layer as a pipe first, by fitting it on the roll frame, and by casting a layer combining the inner wall of the pipe and the outer surface of the roll frame between the pipe and the frame wall.

Problems related to the roll coating layers have also been aimed to be solved by adding fillers or reinforcement fibres to them. However, the filler causes excess hardness of the roll surface and the reinforcement fibres mark on the surface of the paper.

In the following, solutions connected to prior art are described.

Publication U.S. Pat. No. 5,091,027 presents a manufacturing method of a hard roll. A fibre material, which is impregnated with a heat-setting resin, is rolled around the metal core of the roll. A hollow cylinder is formed of the heat-setting synthetic resin in a mould, which cylinder is cured. The metal core coated with fibre material is set inside the hollow cylinder. A ring-like space remains between the inner surface of the hollow cylinder and the fibre layer, to which space is sprayed an adhesive. The adhesive is cured, in which case the metal core coated with the fibre material and the inner surface of the cylinder are attached to each other.

Publication U.S. Pat. No. 6,409,645 presents a method for how the layers can be removed from the roll frame. The roll is manufactured in such a manner that first a removable layer is formed. After that, a polymer material layer is formed. A layer of compressible material can be formed between the removable layer and the polymer material layer. The compressible layer may have an advantageous effect on the stresses formed during manufacture, because it may shrink more than the polymer material layer.

Publication U.S. Pat. No. 4,368,568 presents a manufacturing method for a roll coated with an elastomer material, wherein a nonwoven fabric band is impregnated with heat-setting resin and fine inorganic powder, the nonwoven fabric band is rolled around the metal core of the roll from one end to the other under stress, the heat-setting resin is cured, and an elastomer material layer is formed on the nonwoven fabric layer.

Publication EP 0083301 presents a method for manufacturing a roll with a resilient surface. The roll has a metallic core, onto which is set a coating, which is formed of an elastomer outer layer and an inner hardener layer. Adhesive is sprayed with pressure between the core and the coating.

Publication U.S. Pat. No. 5,753,165 presents a method where the roll frame is upright and a layer of heat-setting resin is cast between the roll frame and the outer cylindrical layer. Both cooling and heating are used in the process.

Publication U.S. Pat. No. 6,328,681 presents a roll, which comprises a cylindrical core, an adhesive layer, and a coating layer. In the coating layer there is a base layer of a polymer material, a connection layer, and a top layer, which comprises elastomer material and a polyethylene mixture containing a very high molecular weight.

The method according to the invention is an improvement in the roll manufacturing technique. The method according to the invention is characterized in that the surface layer is formed on the base layer and cured or solidified after the base layer has been formed on the roll frame.

The residual stresses of a roll manufactured by means of the method according to the invention can be reduced, and thus the performance of the polymer coating can be improved. All the layers of the coating can be processed directly without a separate surface layer manufacture, machining, setting of the surface layer on the roll frame, and the casting of the base layer. When the base layer is formed on the roll frame before the surface layer, it can be ensured that the base layer material exists in all the intended places below the surface layer. Since the surface layer does not at any point need to be a separate pipe, it can be manufactured thinner than before. The roll manufacture becomes cheaper than before with the method according to the invention, and extensive material savings are reached with the method.

A roll manufactured by means of the method according to the invention can be, for example, a calender roll, but other suitable usages come into question as well.

A roll manufactured by means of the method according to the invention comprises a roll frame, a base layer and a surface layer. There can be several mutually different layers in the base and surface layers.

The base layer may comprise mutually different polymer material layers, advantageously there are two of these layers, or the base layer may comprise at least one polymer material layer and at least one reinforcement layer. The polymer material layer is generally plastic material. The reinforcement layer can, when it is set on the roll frame, be a free-space-containing woven structure formed, for example, of high strength fibres. The reinforcement layer can also be impregnated with polymer material in such a manner that the polymer material fills the above-mentioned free space. The reinforcement fibres of the reinforcement layer can be, for example, of fibreglass, carbon fibre or para-aramide fibre. Advantageously, but, however, not necessarily, the reinforcement layer is in the form of a woven fabric. One task of the reinforcement layer is to keep the different layers of the roll together.

The surface layer comprises at least one polymer material layer, which may be heat-setting or thermoplastic. The material of the surface layer is selected in such a manner that its processing and curing temperature is lower than that of the topmost polymer material of the base layer.

In the method according to the invention the coating layers of the roll are formed sequentially from the inside to the out, and directly on the roll frame, i.e. layers manufactured separately as a pipe are not attached on the roll frame. The surface layer can be manufactured, for example, by coiling, casting, or extrusion.

According to a first embodiment of the invention, the base layer is formed of a free-space-containing reinforcement layer and a polymer material layer. The processing temperature of the polymer material layer of the base layer is higher than the processing temperature of the surface layer. When the surface layer is already heat-treated, it shrinks against the base layer. Thus, heat is brought from the inside of the roll frame, in which case the polymer material layer of the base layer changes into liquid, and polymer material transfers, because of the stress caused by the surface layer shrinking, to a free space, for example, between the threads of the woven fabric. The liquid polymer material is cured by means of heat or solidified by cooling, depending on whether the polymer material is heat-setting or thermoplastic. When the polymer material layer of the base layer combines with the reinforcement layer, the residual stress of the surface layer is removed or diminishes significantly.

According to a second embodiment of the invention, the base layer is formed of at least two polymer material layers, of which at least one can be a layer cured by fibres or structures formed of them. In other words, the layer comprises polymer material and reinforcement fibres. The layer closest to the roll frame can be a fibre-reinforced or non-reinforced layer, and the polymer material in it is provided with a good adhesive ability both to the roll frame and the next polymer material layer. In the base layer there is also at least one layer manufactured of a material that shrinks when polymerized, the processing temperature of which is higher than that of the surface layer. When the surface layer is already heat-treated, it shrinks against the base layer. Thus, heat is brought from the inside of the roll frame, in which case the polymer material layer of the base layer becomes liquid, is cured and shrinks when cured. The residual stress of the surface layer is removed or diminishes significantly when the thickness of the base layer is reduced.

In the following, the invention is described by means of drawings, in which

Figure 2:
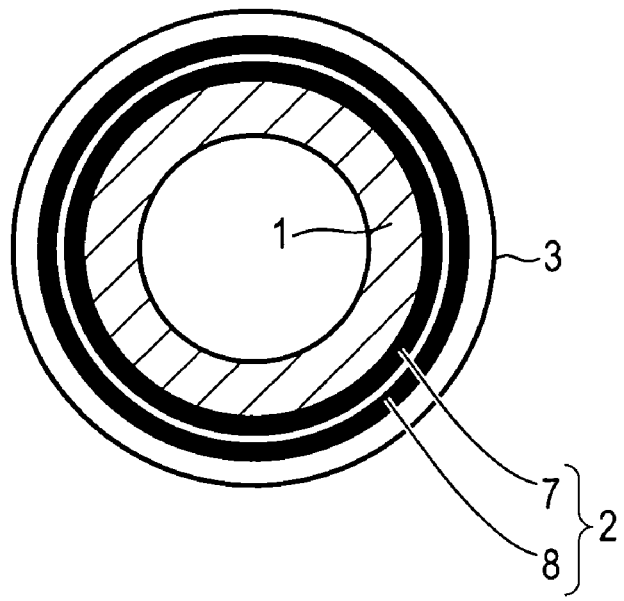

FIG. 1 shows a roll manufactured by means of the method according to the invention in cross-section, and FIG. 2 shows another roll manufactured by means of the method according to the invention in cross-section.

FIG. 1 shows a roll manufactured means of the method according to the invention. The roll comprises a roll frame 1 and a coating. The coating comprises a base layer 2 and a surface layer 3. The structure of the roll frame 1 may vary, but in all cases there is a possibility to bring heat to it from the inside, for example via longitudinal channels. The base layer 2 comprises a reinforcement layer 4 and a polymer material layer 5. In FIG. 1 the polymer material layer 5 is against the roll frame, but the structure is also possible in such a manner that the reinforcement layer 4 is against the roll frame 1, and the polymer material layer 5 is on the reinforcement layer 4.

The roll coating is manufactured by means of the method according to the invention in such a manner that a polymer material layer 5 is applied on the roll frame 1, which layer is solid after application. A free-space-containing reinforcement layer 4, such as a woven fabric formed of high strength fibres, is set onto the polymer material layer 5. The upper surface 4a of the reinforcement layer is sealed with such polymer material, whose adhesiveness to the surface layer 3 is good.

The surface layer 3 is applied onto the reinforcement layer 4 and cured by heat, in which case the surface layer 3 shrinks against the reinforcement layer 4. After this, the roll frame 1 is heated in such a manner that the polymer material layer 5 becomes liquid and the polymer material fills the free space of the reinforcement layer 4 because of the stress caused by the shrinking of the surface layer 3. The residual stress of the surface layer 3 decreases in connection with the event in question.

The roll frame 1 can be heated, for example, by induction heating, liquid, or gas. The material of the polymer material layer 5 may be heat-setting or thermoplastic. The heat-setting material melts and cures in heat, a thermoplastic polymer melts in heat and solidifies when cooling. A suitable material to be used in the polymer material layer 5 can be, for example, of the type mentioned in the publication WO 98/11166.

FIG. 2 shows a roll manufactured by means of the method according to the invention. The roll comprises a roll frame 1 and a coating. The coating comprises a base layer 2 and a surface layer 3. The structure of the roll frame 1 may vary, but in all cases there is a possibility to bring heat to it, for example via longitudinal channels. The base layer 3 comprises an adhesive layer 7 and a middle layer 8. The adhesive layer 7 may be of polymer material or a combination of a polymer material and a structure formed of reinforcement fibres. Onto the adhesive layer 7 is applied the middle layer 8. Onto the middle layer 8 is applied the surface layer 3, whose processing temperature is lower than that of the middle layer 8. The surface layer 3 is cured with heat and let cool, in which case shrinking stress state is formed in the surface layer 3.

After this, heat is brought to the roll frame, in which case the middle layer 1 first melts into liquid and after that cures. When curing, the specific capacity of the polymer material of the middle layer diminishes, in which case the stress status of the surface layer 3 decreases. A suitable material for the middle layer 8 can be, for example a cyclic butylene terephthalate (CBT™ Resins, Cyclics Corporation, USA). The material of the middle layer is characterized in that it shrinks when cured or polymerized.

The invention is not restricted to the description above, but it may vary within the scope of the claims.

The invention claimed is:

1. A method for manufacturing a roll coating onto a roll frame, which coating comprises on the roll frame a base layer comprising at least one heat-setting or thermoplastic polymer material layer, and on the base layer a surface layer comprising at least one heat-setting or thermoplastic polymer material layer in which method the base layer is formed on the roll frame, and the surface layer is formed on the base layer and cured or solidified after the base layer has been formed on the roll frame, and the base layer is brought to its final form after the surface layer has been formed and cured or solidified, wherein the material of the surface layer is selected in such a manner that its curing temperature is lower than that of a topmost polymer material layer of the base layer.

2. The method according to claim 1, wherein the base layer comprises a free-space-containing layer, and after the formation of the surface layer, at least a part of the base layer is brought into a liquid form.

3. The method according to claim 1, wherein the polymer material layer of the base layer is formed of such heat-setting material that shrinks when cured and cooled, and after the formation of the surface layer, the polymer material layer of the base layer is cured.

4. The method according to claim 2, wherein the base layer comprises a polymer material layer and a reinforcement layer constituting the free-space-containing layer.

5. The method according to claim 3, wherein the base layer comprises the polymer material layer and a second polymer material layer, wherein, these polymer material layers are formed of mutually different materials.

6. The method according to claim 5, wherein the second polymer material layer comprises reinforcement fibers.

7. A roll comprising a roll frame and a roll coating on the roll frame, wherein the roll coating comprises a base layer formed on the roll frame, the base layer comprising at least one heat-setting or thermoplastic polymer material layer, and a surface layer formed on the base layer, the surface layer comprising at least one heat-setting or thermoplastic polymer material layer, wherein the material of the surface layer has a curing temperature which is lower than that of a topmost polymer material layer of the base layer.

\* \* \* \* \*